US010445726B1

(12) United States Patent
Edwards et al.

(10) Patent No.: US 10,445,726 B1
(45) Date of Patent: Oct. 15, 2019

(54) PAYMENT CARD AMPLIFICATION DEVICE

(71) Applicant: Capital One Services, LLC, McLean, VA (US)

(72) Inventors: Joshua Edwards, Philadelphia, PA (US); Michael Mossoba, Arlington, VA (US); Abdelkader M'Hamed Benkreira, Washington, DC (US); Daniel John Marsch, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/241,020

(22) Filed: Jan. 7, 2019

(51) Int. Cl.
*G06Q 20/34* (2012.01)
*H04B 5/00* (2006.01)
*G06Q 20/32* (2012.01)

(52) U.S. Cl.
CPC ....... *G06Q 20/353* (2013.01); *G06Q 20/3278* (2013.01); *H04B 5/0031* (2013.01); *H04B 5/0081* (2013.01)

(58) Field of Classification Search
USPC ........................................................ 235/380
See application file for complete search history.

(56) References Cited

U.S. PATENT DOCUMENTS 7,250,876 B2 * 7/2007 Saze ..................... G01C 21/26
340/928

OTHER PUBLICATIONS

Lee, et al., "NFC chip with power amplifier", NFC/RFID Forum—NFC/RFID—TI E2E Community, https://e2e.ti.com/support/wireless_connectivity/nfc_rfid/f/667/t/490947, Dated Apr. 5, 2018, 6 pages.
Wilson, "Signal booster chip makes NFC transactions more reliable", ElectronicsWeekly.com, dated Nov. 2, 2015, 3 pages.
Pinoysw1mmer, "Any way to boost NFC signal?", xda developers forum, https://forum.xda-developers.com/galaxy-s5/help/to-boost-nfc-signal-t2861024, dated Aug. 28, 2014, 5 pages.

* cited by examiner

*Primary Examiner* — Rafferty D Kelly
(74) *Attorney, Agent, or Firm* — DLA Piper LLP (US)

(57) ABSTRACT

In one aspect, the present disclosure relates to a payment card amplification device comprising a card reader, an amplifier, an antenna, and a power supply. The card reader is configured to read payment card information from a payment card and generate an output signal comprising the payment card information. The amplifier is coupled to receive the card reader output signal and configured to generate an amplified signal comprising the payment card information. The antenna is coupled to receive the amplified signal and transmit the payment card information, wherein the transmitted payment card information can be read by a payment terminal. The power supply is coupled to a power source and configured provide power to the card reader and the amplifier.

20 Claims, 4 Drawing Sheets

PAYMENT CARD AMPLIFICATION DEVICE

BACKGROUND

Debit cards, credit cards, and other types of payment cards may include integrated circuits (ICs) or "chips" that can perform processing on the card to provide secure transactions, among other benefits. Such cards may be referred to as "smart cards," "chip cards" or "IC cards." EMV is a standardized payment method for smart cards and payment terminals ("EMV" is not an acronym, but rather a name derived from three companies that created the standard). An EMV card may store payment information within an IC in addition to a magnetic stripe. Some smart cards must be physically inserted into a card reader, while others are "contactless," meaning that they are capable of transmitting payment card information to a payment terminal without requiring physical contact between the card and the terminal.

Because the cards have limited volume and surface area, power is frequently a limited resource, such that low power transmitters are used to conserve card resources. Additionally, the use of low power transmitters limits the ability of unintended parties to eavesdrop on data transmitted by the card. One such communications protocol to allow smart cards and payment terminals to implement contactless payments is near-field communication (NFC) technology. NFC is a set of communication protocols that enable two electronic devices to establish communication, using limited range transmitters to limit unintended reception of the card information. NFC transmitters typically have a range of four (4) cm or less. Alternatively, card information may be transmitted by other communications protocols, including using cellular, wifi, and other protocols.

Many drive-thru restaurants and other businesses accept NFC-enabled payment cards. In addition, some toll-road operators allow drivers to pay using contactless credit and debit cards at toll booths. Alternatively, a driver may be able to obtain a specialized device ("transponder") which allows them to pay for tolls without having to stop their vehicle. Each state or jurisdiction may have its own transponder technology, and incompatible technologies may be used across the country and even within the same state.

SUMMARY

According to one aspect of the present disclosure, a payment card amplification device may include: a card reader configured to read payment card information from a payment card and generate an output signal including the payment card information; an amplifier coupled to receive the card reader output signal and configured to generate an amplified signal including the payment card information; an antenna coupled to receive the amplified signal and transmit the payment card information, wherein the transmitted payment card information can be read by a payment terminal; and a power supply coupled to a power source and configured to provide power to the card reader and the amplifier.

In some embodiments, the transmitted payment card information can be read by a payment terminal using near-field communication (NFC). In some embodiments, the amplified signal can have a power level and a direction selected to enable the transmitted payment card information to be read by a payment terminal at a distance of at least four (4) feet. In some embodiments, the device can include a switch having a first state and a second state, wherein in the first state the switch permits transmission of the payment card information, wherein in the second state the switch prevents transmission of the payment card information. In some embodiments, the switch can include a mechanical switch. In some embodiments, the switch includes an electronically controlled switch. In some embodiments, the payment card information may include EMV data. In some embodiments, the antenna may include a loop antenna. In some embodiments, the power supply can include a Universal Serial Bus (USB) adapter.

According to another aspect of the present disclosure, a system may include: a payment card amplification device including a card reader configured to read payment card information from a payment card; a vehicle navigation system; and a payment controller coupled to the payment card amplification device and the vehicle navigation system. The payment controller may be configured to: receive a current location from the vehicle navigation system, determine if payments are authorized at the current location, and send a control signal to the payment card amplification device to cause the payment card amplification device to generate and transmit an amplified signal including the payment card information such that the transmitted payment card information can be read by a payment terminal.

In some embodiments, the device can include a storage device, wherein determining if payments are authorized at the current location includes retrieving authorized location information from the storage device. In some embodiments, the vehicle navigation system includes a user interface for authorizing payments at selected locations. In some embodiments, the payment card amplification device, vehicle navigation system, and payment controller may be powered by a battery within a vehicle. In some embodiments, the payment controller can be configured to, after a predetermined amount of time, send a control signal to the payment card amplification device to cause the payment card amplification device to stop transmitting the payment card information. In some embodiments, the payment card amplification device may be configured to read the payment card information from the payment card using near-field communication (NFC), wherein the transmitted payment card information can be read by a payment terminal using NFC. In some embodiments, the amplified signal can have a power level and a direction selected to enable the transmitted payment card information to be read by a payment terminal at a distance of at least four (4) feet. In some embodiments, the payment card information may include EMV data. In some embodiments, the system may include a loop antenna to transmit the amplified signal.

According to another aspect of the present disclosure, a method can include: detecting a payment card can be read by a card reader; reading, by the card reader, payment card information from the payment card; receiving a current location from a location sensor; determining the payment card was previously used within a predetermined radius of the current location; and transmitting the payment card information, wherein the payment card information is transmitted using sufficient power to enable the payment card information to be read by a payment terminal at a distance of at least four (4) feet.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to an device for amplifying and transmitting payment card information. Various different payment cards can be supported, including magnetic swipe cards, smart cards, cards that must be inserted or "dipped" into a reader, contactless cards, and EMV standard cards. In some embodiments, the device can include a slot or other opening into which a user can insert a credit or debit card. In other embodiments, the user can tap or lay their card on a surface of the device, or place their card within close proximately of the device without direct contact between the card and device.

The amplification device (or "amplifier") can read payment card information from the card as a signal, amplify the signal, and transmit the amplified signal into free space. The device may be configured to generate an amplified signal with sufficient power (i.e., range) such that it can be received by payment terminals several feet away, e.g. at least four (4) feet away. In some embodiments, the amplified signal may be transmitted in a particular direction (e.g., using a directional antenna pointed at the intended payment terminal) to prevent to the signal from being received by an untrusted party. Thus, embodiments of the present disclosure can allow a user to make payments at a much greater range than would otherwise be possible.

In some embodiments, the payment card amplifier can be used within a vehicle to allow a driver or passenger to pay for goods or services (e.g., at a drive-thru restaurant) without needing to pass their payment card outside the vehicle. In some embodiments, the device can be powered by a vehicle's battery, for example using a USB (Universal Serial Bus) power adapter and/or the vehicle's cigarette lighter. In some embodiments, the payment card amplifier can be used to pay for toll roads without having to stop the vehicle and without requiring a specialized transponder device. For compatibility with existing electronic tolling locations, the payment card amplifier may transmit payment card information using radio-frequency identification (RFID), according to some embodiments. Thus, drivers can use the same form of payment in any state that supports contactless payment terminals along their toll roads, and passengers can share the cost by inserting their own payment card into the device. In some embodiments, a payment card amplification device can be integrated with a vehicle navigation system, such as a factory installed navigation system with a touchscreen display. The payment card amplifier can receive user input information along with geolocation data, such as Global Positioning System (GPS) data, from the vehicle navigation system.

In some embodiments, payment card amplifier can selectively transmit—or not transmit—payment card information based on certain conditions. For example, the device may include a switch or button which the user can engage to cause the device to transmit payment card information. In some embodiments, the device may automatically transmit payment card based on where it is currently located. For example, a user may authorize payments at certain locations. The device may retrieve its current location (e.g., using GPS data from a vehicle navigation system), determine that the user previously authorized payments at that location, and then automatically amplify and transmit payment card information into free space. In some embodiments, a user may authorize selected locations using a vehicle navigation system's touchscreen device. In some embodiments, the payment card amplifier can use a map of known payment locations to determine when to automatically transmit payment card information. For example, the amplifier can use a map of known electronic tolling locations such as a map of "EZ Pass" tolling locations. In some embodiments, the payment card amplifier may include a radio-frequency identification (RFID) transponder for receiving and transmitting RFID signals. In some embodiments, the RFID transponder may be configured to recognize electronic tolling locations (e.g., EZ Pass tolls) and, in response, to automatically transmit payment card information.

Figure 1:
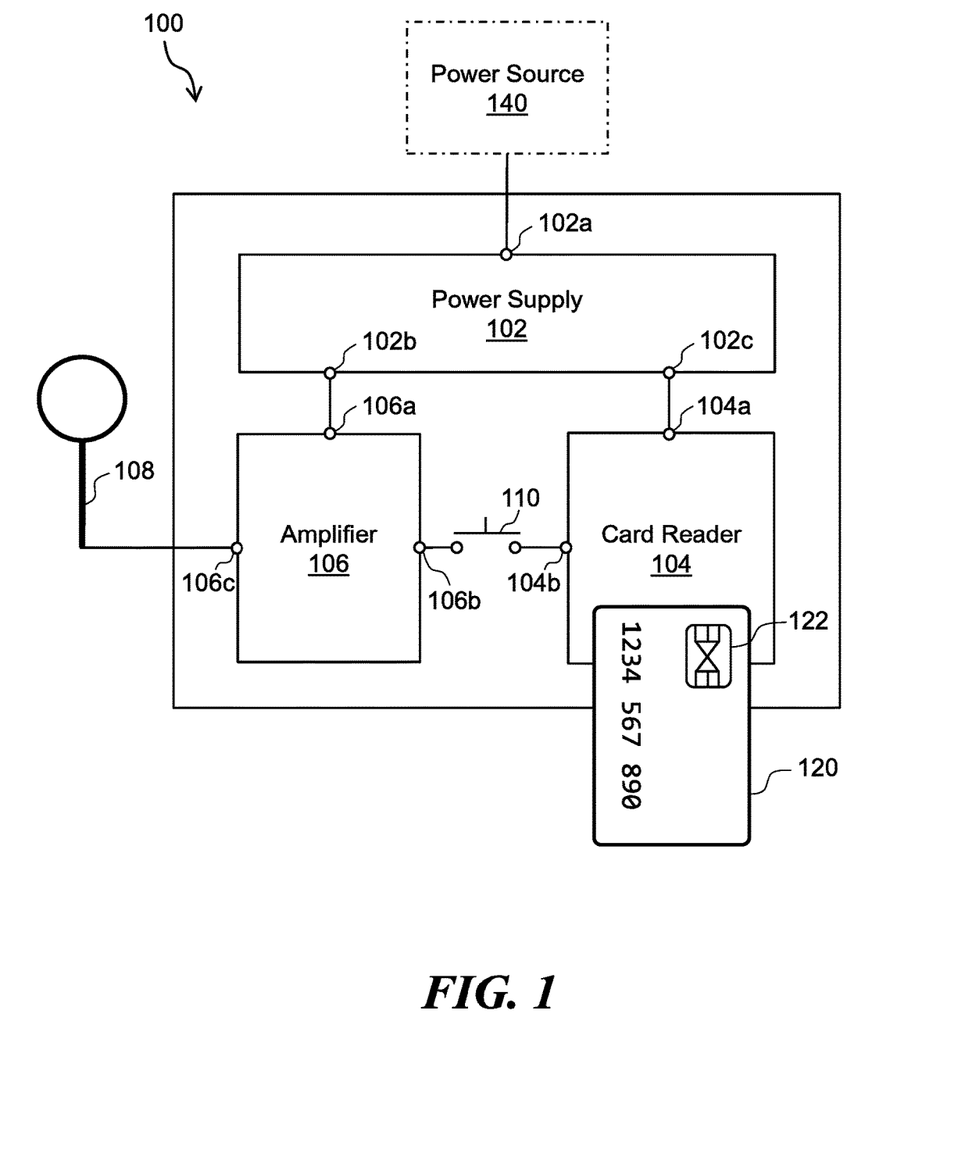
FIG. 1 is a diagram of a payment card amplification device, according to some embodiments of the present disclosure.

FIG. 1 is a diagram of a payment card amplification device (or "amplifier"), according to some embodiments of the present disclosure. The illustrative device 100 can include a power supply 102, card reader 104, amplifier 106, and antenna 108. The power supply 102 can include an input port 102a coupled to power source 140, a first output port 102b coupled to a first port 106a of amplifier 106, and a second output port 102c coupled to a first port 104a of card reader 104. Card reader 104 can include a second port 104b coupled to an second port 106b of amplifier 106, and amplifier 106 can include a third port 106c coupled to antenna 108.

Power supply 102 can include circuitry to regulate voltage and current from power source 140. In some embodiments, power supply 102 may include a direct current to direct current (DC-DC) converter, or an alternating current to direct current (AC-DC) converter. In some embodiments, power source 140 may be a USB power source and input port 102a may be a USB port or adapter. Although the illustrative power supply 102 of FIG. 1 is shown as having two (2) output ports 102b, 102c, a skilled artisan will understand how that the power supply can have an arbitrary number of output ports (102 generally). Each of the output ports 102 may provide a signal having a voltage and current selected according to the requirements of the component coupled thereto.

Card reader 104 can include hardware and/or software configured to read payment card information from payment card 120 and to generate an output signal at second port 104b. The payment card information can include, for example, account number, expiration date, and a card verification value ("CVV") number. The information can also include electronic payment information in tokenized and/or encrypted form, such as may be provided by an EMV or other smart processor or storage on the card. In some embodiments, the payment card information may correspond to EMV data in accordance with the ISO/IEC 7816 standard. The output signal can be an analog or digital signal that encodes the payment card information read from payment card 120. In some embodiments, the output signal may be an analog signal having radio frequency (RF), such as a signal within an unlicensed industrial, scientific and medical (ISM) radio band.

In some embodiments, card reader 104 may include a slot into which payment cards 120 can be inserted or "dipped" to provide contact between the reader 104 and an IC on the payment card. In some embodiments, card reader 104 may have a magnetic card reader through which payment cards 120 can be swiped. In some embodiments, card reader 104 may include hardware and/or software to receive contactless card transmissions from payment cards 120. For example, card reader 104 may include NFC receiver circuitry. In this configuration, payment cards 120 need not be placed in direct contact with the reader 104 but, for example, could be placed in close proximity of the reader 104. For convenience, device 100 can include a card holder or slot into which the user can place their payment card 120 even if the card and reader 104 are contactless.

Amplifier 106 can include circuitry configured to receive, as input, the card reader output signal at second port 106b and to generate, as output, an amplified signal at third port 106c. The amplified signal includes or otherwise encodes the payment card information read from card 120. In some embodiments, the amplified signal is similar to the card reader output signal except that it has increased power. Amplifier 106 can include an RF power amplifier (PA) to convert a low-power RF signal to a high-power signal. In some embodiments, card reader 104 may output a baseband signal and amplifier 106 can include circuitry to up-convert the baseband signal to an RF signal within, for example, an ISM band. A skilled artisan will understand that other RF bands can be used to transmit payment card information. In some embodiments, the amplification power can be varied to adjust the range of the transmitted payment card information. For example, device 100 may include a dial which the user can adjust to increase or decrease the range of the transmitted payment card information. As another example, the amplification power may be electronically controlled as discussed below in conjunction with FIG. 3.

The amplified signal at port 106c may be transmitted into free space via antenna 108. In some embodiments, antenna 108 may be provided as a loop antenna (sometimes referred to as a "power coil"). The transmitted signal includes or otherwise encodes the payment card information which can be received by payment terminals within range. Thus, payment card amplification device 100 can be used to complete payments at a greater distance than would otherwise be possible using existing technologies.

In some embodiments, device 100 can include a switch 110 that selectively controls when the device transmits the payment card information. As shown in FIG. 1, switch 110 may be positioned between card reader 104 and amplifier 106 in some embodiments. More particularly, switch 110 may have a first terminal coupled to card reader port 104b and a second terminal coupled to amplifier port 106b. Switch 110 can be provided as a mechanical switch, such as a momentary button that can be presented by a user, or as an electronically controlled switch. In some embodiments, switch 110 may be electronically controlled, as discussed below in the context of FIG. 3.

In some embodiments, device 100 may function as receiver as well as a transmitter. For example, antenna 108 can receive a wireless signal transmitted from a payment terminal and the received signal may be sent to the payment card 120 via card reader 104. In this configuration, amplifier 106 may include a low-noise amplifier (LNA) configured to receive an RF signal from antenna 108 via port 106c, and to provide an amplified signal (with a sufficiently high signal-to-noise ration) to port 104b of card reader 104. Thus, ports 106c, 106b, and 104b may correspond to bi-directional ports, according to some embodiments.

Figure 2:
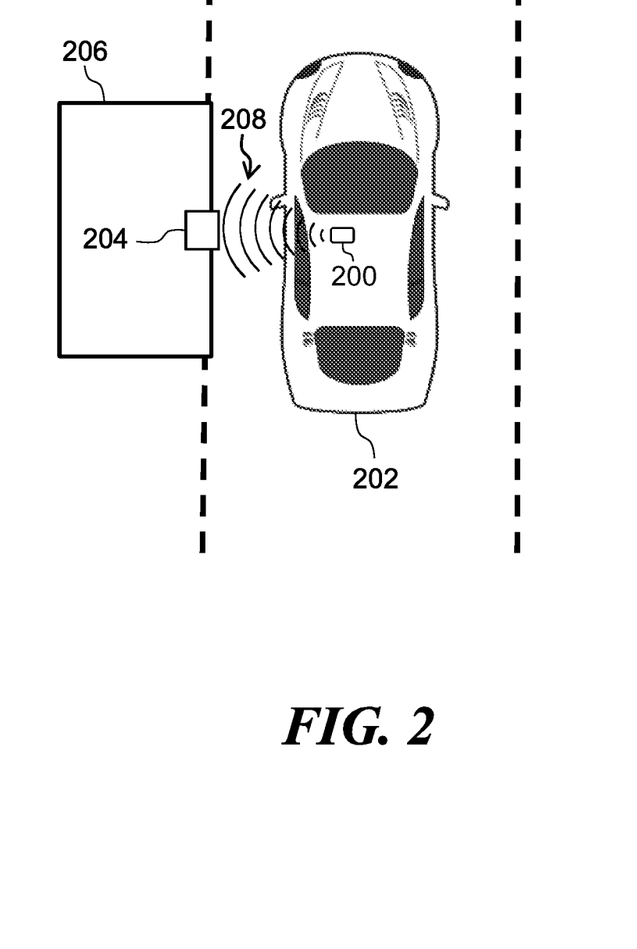
FIG. 2 shows a payment card amplification device used within a vehicle, according to some embodiments of the present disclosure.

FIG. 2 illustrates how a payment card amplification device (or "amplifier") can be used to make purchases from within a vehicle, according to some embodiments of the present disclosure. A payment card amplifier 200, which can be the same or similar to device 100 in FIG. 1, may be located within a car, truck, or other type of vehicle 202. Amplifier 200 may have a portable form factor suitable to be placed in a cup holder or mounted on the dashboard of the vehicle 202. In some embodiments, amplifier 200 may be fixedly attached to the inside of the vehicle 202. In some embodiments, amplifier 200 may be integrated into a vehicle navigation system.

A driver or passenger within vehicle 202 may insert a payment card into or otherwise place a card nearby amplifier 200. The amplifier 200 can read the card information and generate an amplified signal 208 transmitted into free space. The transmit signal, which includes or otherwise encodes the payment card information, may be received by a payment terminal 204 within range. The amplification power of the device 200 may be selected such that the transmitted signal can reach the payment terminal 204. The payment terminal 204 may be located, for example, at a drive thru restaurant or toll booth 206.

Figure 3:
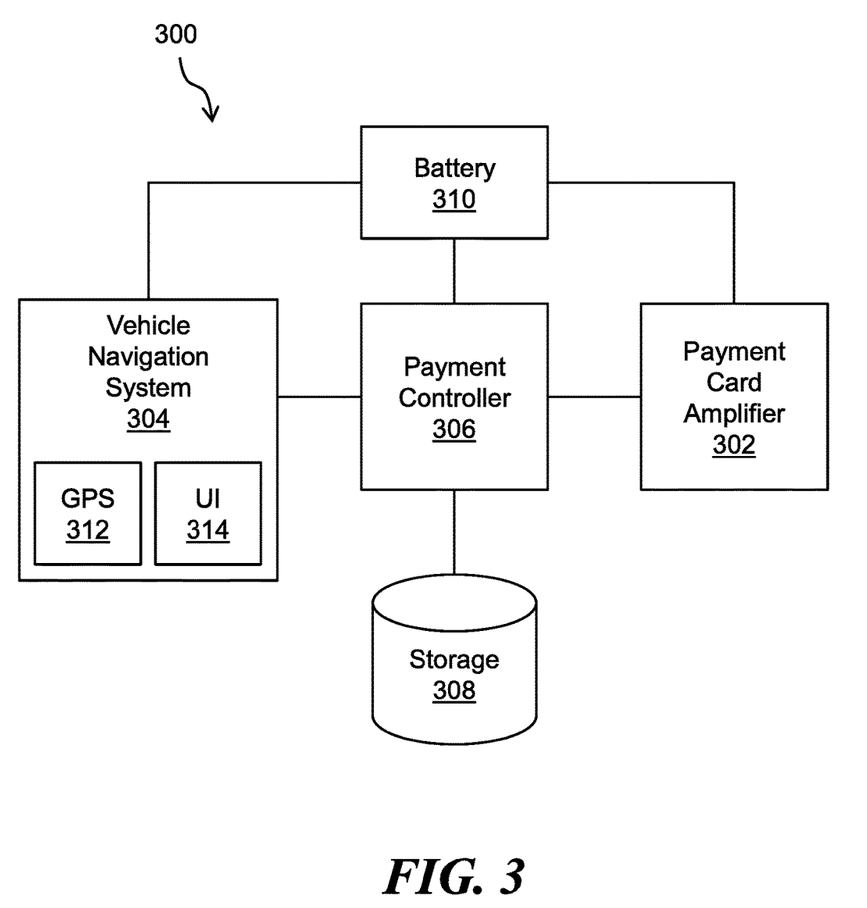
FIG. 3 is a diagram of payment card amplification device integrated with a vehicle navigation system, according to some embodiments of the present disclosure.

FIG. 3 is a diagram of payment card amplifier integrated with a vehicle navigation system, according to some embodiments of the present disclosure. The illustrative system 300 can include a payment card amplifier 302 coupled to a vehicle navigation system 304 via a payment controller 306. Payment card amplifier 302, vehicle navigation system 304, and payment controller 306 may each be connected to and powered by a battery 310 within the vehicle. In some embodiments, the system 300 can include a storage device 308 configured to store information about locations at which payments have been authorized. In some embodiments, storage device 308 may be provided as non-violate computer memory, such as flash memory.

Vehicle navigation system 304 can include a GPS receiver 312 and a user interface (UI) 314. The UI 314 can include hardware and/or software configured to display information to a user and to receive input from the user. In some embodiments, UI 314 may include a touchscreen device. UI 314 can use location data from GPS receiver 312 to determine the vehicle's current location and display the current location to the user on a map display. In some embodiments, UI 314 can allow a user to select specific locations at which payments are authorized. For example, UI 314 may allow a user to authorize payments at (or near) a particular location by touching or clicking on a point on a map display. As another example, UI 314 may allow a user to enter a particular street address where payments are authorized. As yet another example, the user may enter the name of a business, or chain of businesses, at which payments are authorized. The authorized locations (e.g., GPS coordinates, street addresses, and/or place names) may be sent to payment controller 306 and stored within storage device 308.

Payment card amplifier 302, which may be the same as or similar to amplifier 100 described above in the context of FIG. 1, can be configured to selectively transmit a user's payment card information into free space based on an electronic control signal from payment controller 306. In some embodiments, payment card amplifier 302 may include or otherwise be coupled to a mechanical control (e.g., a button) which the user can activate to cause payment card information to be transmitted or not, thus providing an override to payment controller 306. In some embodiments, the user can authorize payments at a current location using the mechanical control.

Payment controller 306 can include hardware and/or software to interface with vehicle navigation system 304, to read and write data to storage device 308, and to control the payment card amplifier 302. Payment controller 306 can receive user input information from vehicle navigation system 304 and/or payment card amplifier 302. The user input information may include information about specific locations for which the user authorizes payments. Payment controller 306 can record authorized location information to storage device 308.

In some embodiments, payment controller 306 can cause the amplifier 302 to transmit payment card information automatically based on the vehicle's current location. In particular, payment controller 306 can receive, on a continuous or near-continuous basis, current location information from vehicle navigation system 304 and compare the received location information against previously authorized location information (e.g., within storage device 308). In response to determining that payments are authorized for the current location, payment controller 306 may send a control signal to amplifier 302 causing it to transmit amplified payment card information into free space. In some embodiments, payment controller 306 can control the amplification power of payment card amplifier 302. For example, payment controller 306 may select a minimum amplification power needed to transmit the payment card information to a nearby payment terminal based on information about where the payment terminal is located relative to the vehicle. In some embodiments, payment controller 306 can cause amplifier 302 to stop transmitting payment card information after a predetermined amount of time has passed.

In some embodiments, payment controller 306 and/or storage device 308 may be provided upon the same hardware resources as vehicle navigation system 304.

Figure 4:
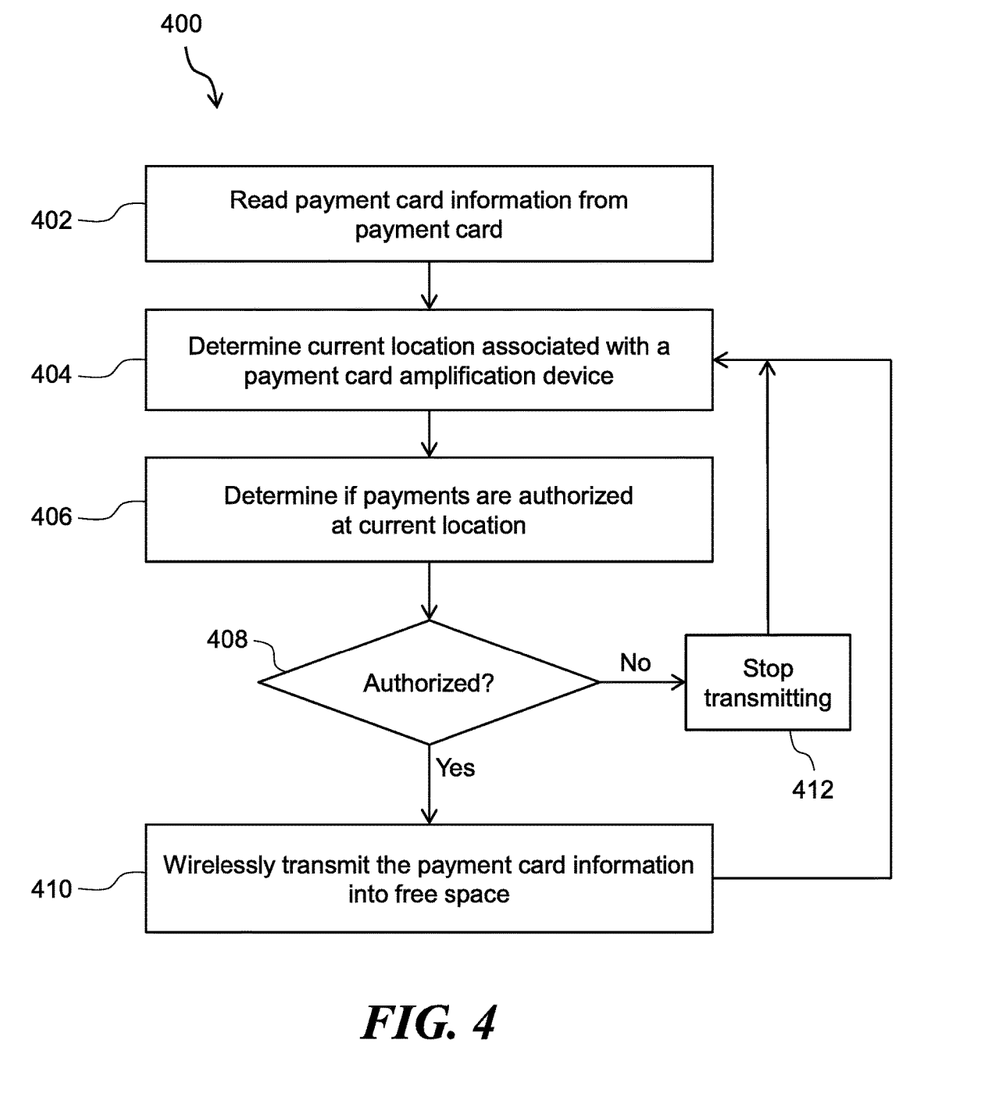
FIG. 4 is a flow diagram showing processing that may occur within a payment card amplification system, according to some embodiments of the present disclosure.

FIG. 4 is a flow diagram showing processing that may occur within a payment card amplification device or system (e.g., as device 100 of FIG. 1 or system 300 of FIG. 3), according to some embodiments of the present disclosure. Illustrative method 400 can be used to automatically transmit payment card information to payment terminals when a payment card amplification device (or "amplifier") is moved to an authorized location (or a vehicle in which the amplifier is situated travels to the authorized location).

At block 402, payment card information is read from a payment card. For example, a card reader (e.g., card reader 104 in FIG. 1) can read information from a card that is inserted into or placed in close proximity to a payment card amplification device (e.g., amplifier 100 in FIG. 1). Communication between the amplification device and the card reader may be bi-directional.

At block 404, a current location associated with the amplifier is determined. In some embodiments, the amplifier can include a GPS receiver used determine the current location. In other embodiments, the amplifier may receive the current location from a vehicle navigation system (e.g., navigation system 304 in FIG. 3).

At block 406, it is determined if payments are authorized at the current location. In some embodiments, the amplifier may include or otherwise have access to a storage device configured to store authorized location information. For example, the storage device may store GPS coordinates, street addresses, and/or place names where payments are authorized. In some embodiments, the amplifier can use a map of known payment locations to determine when to automatically transmit payment card information. For example, the amplifier can use a map of known electronic tolling locations such as a map of "EZ Pass" tolling locations. In some embodiments, the amplifier may include a button or other type of mechanical switch that the user can activate to authorize payments at the current location. The amplifier may record the current location to storage as an authorized location such that payments are automatically authorized at the same location in the future. In some embodiments, a user can authorize locations using a vehicle navigation system, e.g. using a touchscreen or other user input device.

At block 408, if payments are authorized at the current location, then at block 410, the amplifier may wirelessly transmit the payment card information where it can be received by payment terminals. In some embodiments, a payment controller (e.g., controller 306 in FIG. 3) sends an electronic control signal to the amplifier causing it to transmit the payment card information, such as in response to a transmission request. In some embodiments, the amplifier transmits the payment card information for a predetermined amount of time before stopping transmission. In some embodiments, the transmit time period might be selected based on signal strength and/or information about the operating environment. For example, if a high transmit power is selected, a short transmit time period may be selected to reduce the chance that the payment information will be intercepted by a third party. As another example, when driving through a toll both at relatively high speed, a longer transmit time period may be selected to increase the likelihood that the signal will be received by the payment terminal (a higher transmit power may also be selected in this scenario). If payments are not authorized at the current location, then the amplifier does not transmit the card information and may stop any in-progress transmissions (block 412). The method 400 may repeat from block 404, as shown in FIG. 1.

Methods described herein may represent processing that occurs within a device or system, such as device 100 of FIG. 1 or system 300 of FIG. 3. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A system comprising:
   a payment card amplification device comprising a card reader configured to read payment card information from a payment card;
   a vehicle navigation system; and
   a payment controller coupled to the payment card amplification device and the vehicle navigation system, the payment controller configured to:
   receive a current location from the vehicle navigation system,
   determine if payments are authorized at the current location, and
   send a control signal to the payment card amplification device to cause the payment card amplification device to generate and transmit an amplified signal comprising the payment card information, wherein the transmitted payment card information can be read by a payment terminal.

2. The system of claim 1 comprising a storage device, wherein determining if payments are authorized at the current location comprises retrieving authorized location information from the storage device.

3. The system of claim 1 wherein the vehicle navigation system comprises a user interface for authorizing payments at selected locations.

4. The system of claim 1 wherein the payment card amplification device, vehicle navigation system, and payment controller are powered by a battery within a vehicle.

5. The system of claim 1 wherein the payment controller is configured to, after a predetermined amount of time, send a control signal to the payment card amplification device to cause the payment card amplification device to stop transmitting the payment card information.

6. The system of claim 1, wherein the transmitted payment card information can be read by a payment terminal using near-field communication (NFC).

7. The system of claim 1 wherein the amplified signal has a power level and a direction selected to enable the transmitted payment card information to be read by a payment terminal at a distance of at least four (4) feet.

8. The system of claim 1 wherein the payment card information comprises EMV data.

9. The system of claim 1 comprising a loop antenna to transmit the amplified signal.

10. The system of claim 1 wherein the payment card amplification device comprises:
    an amplifier coupled to receive the card reader output signal and configured to generate an amplified signal comprising the payment card information;
    an antenna coupled to receive the amplified signal and transmit the payment card information, wherein the transmitted payment card information can be read by a payment terminal; and
    a power supply coupled to a power source and configured to provide power to the card reader and the amplifier.

11. The system of claim 1 wherein the payment card amplification device comprises:
    a switch having a first state and a second state, wherein in the first state the switch permits transmission of the payment card information, wherein in the second state the switch prevents transmission of the payment card information.

12. The system of claim 11 wherein the switch comprises a mechanical switch.

13. The system of claim 11 wherein the switch comprises an electronically controlled switch.

14. The system of claim 11 wherein the power supply comprises a Universal Serial Bus (USB) adapter.

15. A method comprising:
    detecting a payment card can be read by a card reader;
    reading, by the card reader, payment card information from the payment card;
    receiving a current location from a location sensor;
    determining the payment card was previously used within a predetermined radius of the current location; and transmitting the payment card information, wherein the payment card information is transmitted using sufficient power to enable the payment card information to be read by a payment terminal at a distance of at least four (4) feet.

16. The method of claim 15, wherein the transmitted payment card information can be read by a payment terminal using near-field communication (NFC).

17. The method of claim 15 wherein transmitting the payment card information comprises transmitting EMV data.

18. The method of claim 15 wherein transmitting the payment card information comprises transmitting the payment card information using a loop antenna.

19. The method of claim 15 wherein transmitting the payment card information comprises transmitting the payment card information for a predetermined amount of time.

20. The method of claim 15 wherein receiving the current location comprises receiving the current location from a vehicle navigation system.

* * * * *